(12) United States Patent
Vliet et al.

(10) Patent No.: US 11,285,838 B2
(45) Date of Patent: Mar. 29, 2022

(54) FLEXIBLE MOBILE ROBOT CHARGING SYSTEMS AND METHODS

(71) Applicant: Target Brands, Inc., Minneapolis, MN (US)

(72) Inventors: Kevin Vliet, Minneapolis, MN (US); Gregory Lisso, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 735 days.

(21) Appl. No.: 16/257,329

(22) Filed: Jan. 25, 2019

(65) Prior Publication Data

US 2020/0238848 A1    Jul. 30, 2020

(51) Int. Cl.
| | |
|---|---|
| *B60L 53/67* | (2019.01) |
| *B25J 19/00* | (2006.01) |
| *G05D 1/02* | (2020.01) |
| *B60L 53/16* | (2019.01) |
| *B60L 53/30* | (2019.01) |

(52) U.S. Cl.
CPC .............. *B60L 53/67* (2019.02); *B25J 19/005* (2013.01); *B60L 53/16* (2019.02); *B60L 53/305* (2019.02); *G05D 1/0225* (2013.01); *G05D 1/0297* (2013.01); *G05D 2201/0216* (2013.01)

(58) Field of Classification Search
USPC ......................................................... 700/250
See application file for complete search history.

(56) References Cited

U.S. PATENT DOCUMENTS

| | | |
|---|---|---|
| 8,150,551 B2 | 4/2012 | Kaneko et al. |
| 8,922,163 B2 | 12/2014 | MacDonald |
| 9,056,555 B1 | 6/2015 | Zhou |
| 9,397,518 B1 * | 7/2016 | Theobald ............... B25J 9/0087 |
| 9,711,985 B1 | 7/2017 | Johnson et al. |
| 9,932,019 B2 | 4/2018 | Hassounah |
| 2016/0368464 A1 * | 12/2016 | Hassounah ............ B60L 53/80 |
| 2018/0104829 A1 * | 4/2018 | Altman ..................... B25J 9/162 |
| 2018/0373258 A1 * | 12/2018 | Fici ....................... G05D 1/0282 |
| 2020/0238848 A1 * | 7/2020 | Vliet ..................... B60L 53/305 |

* cited by examiner

*Primary Examiner* — Md Azad
(74) *Attorney, Agent, or Firm* — Fish & Richardson P.C.

(57) ABSTRACT

Flexible mobile robot charging systems described herein can be automatically moved to the work areas of energy-depleted mobile robots to provide onboard battery recharging without requiring the mobile robots to spend time traveling to a fixed location battery recharging station located away from the work area or in a suboptimal location within the robotic work area. Accordingly, the efficiency and utilization of the mobile robots can be enhanced by eliminating non-value-added travel time of the mobile robots and the time and cost of setting up the battery recharging stations can be reduced using the mobile robot charging systems and methods.

14 Claims, 6 Drawing Sheets

FLEXIBLE MOBILE ROBOT CHARGING SYSTEMS AND METHODS

This document relates to systems and methods for enhancing the efficiencies of setting up and operating mobile robotic systems. For example, this document relates to flexible mobile robot charging systems that can be dynamically moved within the work area of energy-depleted mobile robots to provide recharging without requiring the mobile robots to spend time traveling to a fixed location recharging station located away from the work area.

BACKGROUND

Mobile robots are usually powered by energy stored in onboard batteries. For example, some mobile robots are powered by rechargeable, onboard NiCd, lithium ion, or NiMH battery cells. As a mobile robot works and uses energy, the energy stored in the onboard battery is gradually depleted. If the battery of a mobile robot is not recharged, over time the battery will discharge all of its stored energy and the mobile robot will become immobilized and no longer able to perform any useful work.

By monitoring its own battery status, a mobile robot can detect when the energy level of its battery is low and in the need of a recharge. In such a case, the mobile robot can travel to a charging station, connect to the charging station (e.g., self-dock with the charging station), and receive electrical energy to recharge its batteries. When the mobile robot's energy level is once again high enough, the mobile robot can disconnect from the charging station and travel back to the work area to resume working.

In some cases, about 25% of a mobile robot's time is spent traveling to a fixed location battery recharging station and recharging its batteries.

SUMMARY

This document describes systems and methods for enhancing the efficiencies of setting up and operating mobile robotic systems. For example, this document describes flexible mobile robot battery recharging systems that can be moved dynamically within the work area of energy-depleted mobile robots to provide recharging without requiring the mobile robots to spend time and energy traveling to a fixed location recharging station located away from the immediate work area or located sub-optimally within the work area. Accordingly, the efficiency and utilization of the mobile robots can be enhanced by eliminating non-value-added travel time associated with the battery recharging process. Many other additional benefits including a reduction in the time and cost to setup and scale the mobile robotic system are also obtained, as described further below.

In one aspect, this disclosure is directed to a mobile robot system. The mobile robot system includes a control system; one or more mobile robots in communication with the control system such that the one or more mobile robots individually move along a floor surface in accordance with mobile robot control commands that are received from the control system; and a mobile battery unit configured to be transported along the floor surface by an individual mobile robot in response to control commands that are received by the individual mobile robot from the control system. The mobile battery unit includes one or more onboard batteries, and a plurality of electrical connections in electrical communication with the one or more onboard batteries. The plurality of electrical connections are configured to releasably couple with corresponding electrical connections of the one or more mobile robots such that energy from the one or more onboard batteries is transferred to the one or more mobile robots.

Such a mobile robot system may optionally include one or more of the following features. The energy from the one or more onboard batteries may be transferred to respective onboard batteries of the one or more mobile robots when the plurality of electrical connections are coupled with the corresponding electrical connections of the one or more mobile robots. The plurality of electrical connections may configure the mobile battery unit to releasably couple with and transfer the energy from the one or more onboard batteries to two or more of the mobile robots simultaneously. The plurality of electrical connections may configure the mobile battery unit to releasably couple with and transfer the energy from the one or more onboard batteries to four or more of the mobile robots simultaneously. The mobile battery unit may be a first mobile battery unit, and the system may also include a second mobile battery unit. The mobile robot system may also include a docking station configured to electrically releasably couple with the first and second mobile battery units, individually, and to charge the respective one or more onboard batteries of the first and second mobile battery units. The docking station may include one or more high-capacity stationary storage battery units that are charged by high voltage AC power.

In another aspect, this disclosure is directed to a method for recharging one or more mobile robots. The method includes: (i) controlling, by a control system, a first mobile robot to autonomously move across a floor surface to a first location of a first mobile battery unit, wherein the first mobile battery unit comprises one or more onboard batteries; (ii) controlling, by the control system, the first mobile robot to autonomously engage with the first mobile battery unit and to transport the first mobile battery unit to a second location determined by the control system; and (iii) controlling, by the control system, a second mobile robot to autonomously move across the floor surface toward the first mobile battery unit while the first mobile battery unit is at the second location and to electrically couple with the first mobile battery unit such that energy from the one or more onboard batteries of the first mobile battery unit is transferred to the second mobile robot.

Such a method for recharging one or more mobile robots may optionally include one or more of the following features. The method may also include controlling, by the control system, a third mobile robot to autonomously move across the floor surface toward the first mobile battery unit and to electrically couple with the first mobile battery unit such that energy from the one or more onboard batteries is transferred to the third mobile robot. The second and third mobile robots may each be electrically coupled with the first mobile battery unit such that energy from the one or more onboard batteries is transferred to the second and third mobile robots simultaneously. The method may also include determining, by the control system, the second location based on respective locations of the second and third mobile robots prior to the electrical coupling of the second and third mobile robots with the first mobile battery unit.

In another aspect, this disclosure is directed to a mobile robot system. The mobile robot system can include an external control system; one or more mobile robots in wireless communication with the external control system such that the one or more mobile robots individually move along a floor surface in accordance with mobile robot control commands that are wirelessly received from the control system; and an autonomous mobile battery charger in wireless communication with the external control system such that the autonomous mobile battery charger moves along the floor surface in accordance with mobile battery charger control commands that are wirelessly received from the external control system. The autonomous mobile battery charger can include one or more onboard batteries, and a plurality of electrical connections in electrical communication with the one or more onboard batteries and configured to releasably couple with corresponding electrical connections of the one or more mobile robots such that energy from the one or more onboard batteries is transferred to the one or more mobile robots.

Such a mobile robot system may optionally include one or more of the following features. The energy from the one or more onboard batteries may be transferred to respective onboard batteries of the one or more mobile robots when the plurality of electrical connections are coupled with the corresponding electrical connections of the one or more mobile robots. The plurality of electrical connections may configure the autonomous mobile battery charger to releasably couple with and transfer the energy from the one or more onboard batteries to two or more of the mobile robots simultaneously. The plurality of electrical connections may configure the autonomous mobile battery charger to releasably couple with and transfer the energy from the one or more onboard batteries to four or more of the mobile robots simultaneously. The autonomous mobile battery charger may be a first autonomous mobile battery charger and the system may also include a second autonomous mobile battery charger. The mobile robot system may also include a docking station configured to electrically releasably couple with the first and second autonomous mobile battery chargers, individually, and to charge the respective one or more onboard batteries of the first and second autonomous mobile battery chargers. The autonomous mobile battery charger unit may also include: a chassis to which the one or more onboard batteries are coupled; one or more motors coupled to the chassis; one or more wheels movably coupled to the chassis and operatively coupled to the one or more motors such that activating the one or more motors drives the one or more wheels and thereby causes the autonomous mobile battery charger unit to move along a floor surface that the one or more wheels contact; and an onboard controller configured to wirelessly communicate with the external control system and to actuate the one or more motors in response to control commands wirelessly received from the external control system. The plurality of electrical connections may configure the autonomous mobile battery charger unit to releasably couple with and to transfer the energy from the one or more onboard batteries to two or more mobile robots simultaneously. The plurality of electrical connections may configure the autonomous mobile battery charger unit to releasably couple with and to transfer the energy from the one or more onboard batteries to four or more mobile robots simultaneously.

The systems and processes described here may be used to provide one or more of the following benefits. First, the efficiencies of mobile robots can be increased using the systems and methods described herein. The efficiencies can be increased, for example, by reducing the amount of time that mobile robots spend traveling to and from a fixed location battery recharging station. Accordingly, a fleet of mobile robots can be utilized more productively by implementing the systems and methods described herein. Moreover, because of such increased utilization, a fewer number of mobile robots may be needed to perform the same amount of work that would be performed when a fixed location battery recharging station is used. While additional mobile robots that serve the role of moving recharging stations to and from dynamic locations within the mobile robotic field and the primary battery pack recharging area may be added to the system, the overall net effect will tend to result in a reduction in the total number of mobile robots required.

Second, the systems and methods described herein consume less energy overall as compared to systems that require individual mobile robots to travel to a fixed-location recharging station. Hence, operating costs and environmental impacts are both advantageously reduced using the systems and methods described herein.

Third, implementation of the systems and methods described herein facilitates enhanced flexibility and scalability of operations that use mobile robots. That can be the case, for example, because the need for conventional hard-wired charging stations within the robotic work area is reduced or eliminated by the systems and methods described herein. Accordingly, mobile robot operations can be readily reconfigured and/or enlarged without the need for the expensive and time-consuming rewiring or adding of conventional hard-wired mobile robot charging stations, thereby easing expansion and improving the speed of deployment. In some cases, the systems and methods describe herein can allow for hard wiring for charging stations to be installed only near the location of a facility's primary electric service feed from the utility. Such an arrangement advantageously minimizes investment for hard wiring across the entire robotic work area within the facility. Moreover, some conventional mobile robot charging stations utilize inductive energy transfer from primary coils that are embedded in a floor. In contrast, the systems and methods described herein advantageously provide much greater flexibility and scalability in comparison to such hard-wired inductive charging arrangements.

Fourth, implementation of the systems and methods described herein advantageously provides the opportunity to upgrade battery technology in keeping with technological advancements in an economical manner. For example, the stationary storage batteries used in the mobile battery recharging units described herein can be upgraded as battery technology advances, while the batteries in the mobile robots themselves need not be. In that fashion, benefits such as improved cycle time and run time from using state of the art stationary storage batteries can be obtained in a cost-efficient manner.

Fifth, by efficiently facilitating the use of mobile robots, labor costs associated with order fulfillment processes overall may be reduced using the automated systems and processes described herein. For example, the systems and processes described herein can function largely autonomously or semi-autonomously, thereby reducing the need for human involvement in the process of transporting items that are picked from inventory and/or that need to be stowed into inventory. The lessened human involvement advantageously translates to lower operating costs.

Sixth, the use of automation systems such as mobile robots as described herein can accelerate the speed of order fulfillment processes. Moreover, using the systems and methods described herein the numbers of mobile robots can be reduced as described above, thereby mitigating traffic congestion and wait times of the mobile robots while in operation. Such reductions in cycle time for order fulfillment in some cases can facilitate quicker delivery of ordered items to customers, stores, and the like. Accordingly, customer satisfaction can be increased, and inventory-carrying costs can be decreased.

Other features, aspects and potential advantages will be apparent from the accompanying description and figures.

DESCRIPTION OF DRAWINGS

Like reference symbols in the various drawings indicate like elements.

DETAILED DESCRIPTION

Figure 1:
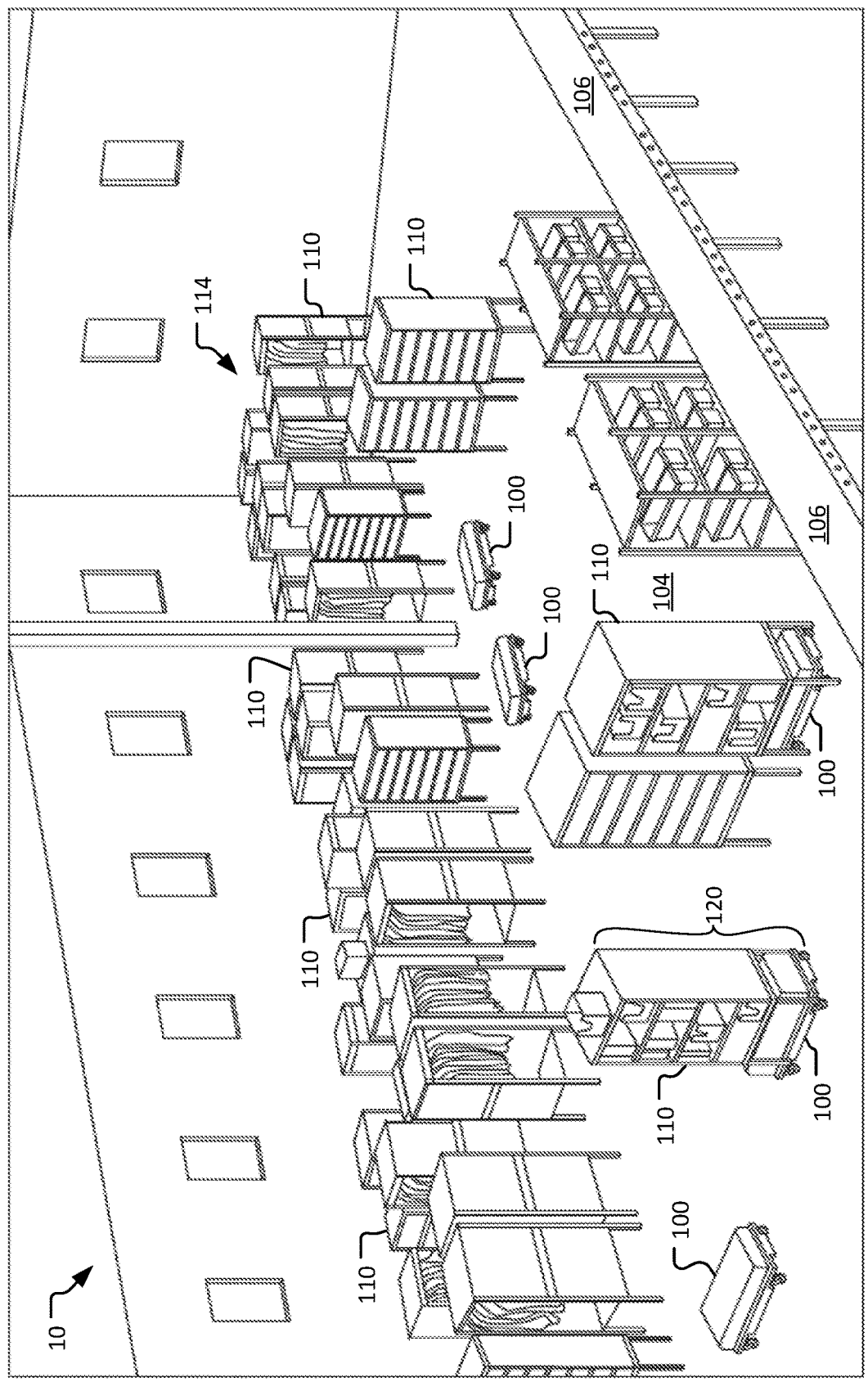
FIG. 1 illustrates an example facility with multiple mobile robots that are autonomously, or semi-autonomously, working to transport racks between storage locations and a processing area.

FIG. 1 depicts an example warehouse operation 10 that uses one or more mobile robots 100. The example warehouse operation 10 is representative of any type of facility or operation that uses mobile robots 100, such as, but not limited to, distribution centers, warehouses, flow centers, inventory storing locations, order fulfillment centers, receiving centers, stores, cross-docking facilities, material handling facilities, and the like, and combinations thereof.

For illustrative purposes, the depicted warehouse operation 10 includes an example rack storage area 114 and an example processing area 104. The rack storage area 114 includes multiple racks 110 that are typically arranged in rows so as to define aisles along which the mobile robots 100 can travel. At the example processing area 104, a human worker or robot can transfer items stored on the racks 110 to a conveyor 106, or vice versa. The conveyor 106 can transfer the items to/from another area, such as to a shipping dock area, and the like. Again, it should be understood that the example warehouse operation 10 is provided here merely as a representation of any type of facility or operation that uses mobile robots 100.

In this example warehouse operation 10, the one or more mobile robots 100 can autonomously, or semi-autonomously, transfer racks 110 between the rack storage area 114 and the processing area 104. For example, a mobile robot 100 can travel under a rack 110, and then raise the rack 110 off the floor, to create a mobilized rack 120.

The mobile robots 100 are powered by energy stored in one or more onboard rechargeable batteries. As the mobile robots 100 perform the work of transferring the racks 110 between the rack storage area 114 and the processing area 104, the energy stored in the onboard batteries of the mobile robots 100 is gradually depleted, and eventually the onboard batteries will need recharging.

Figure 2:
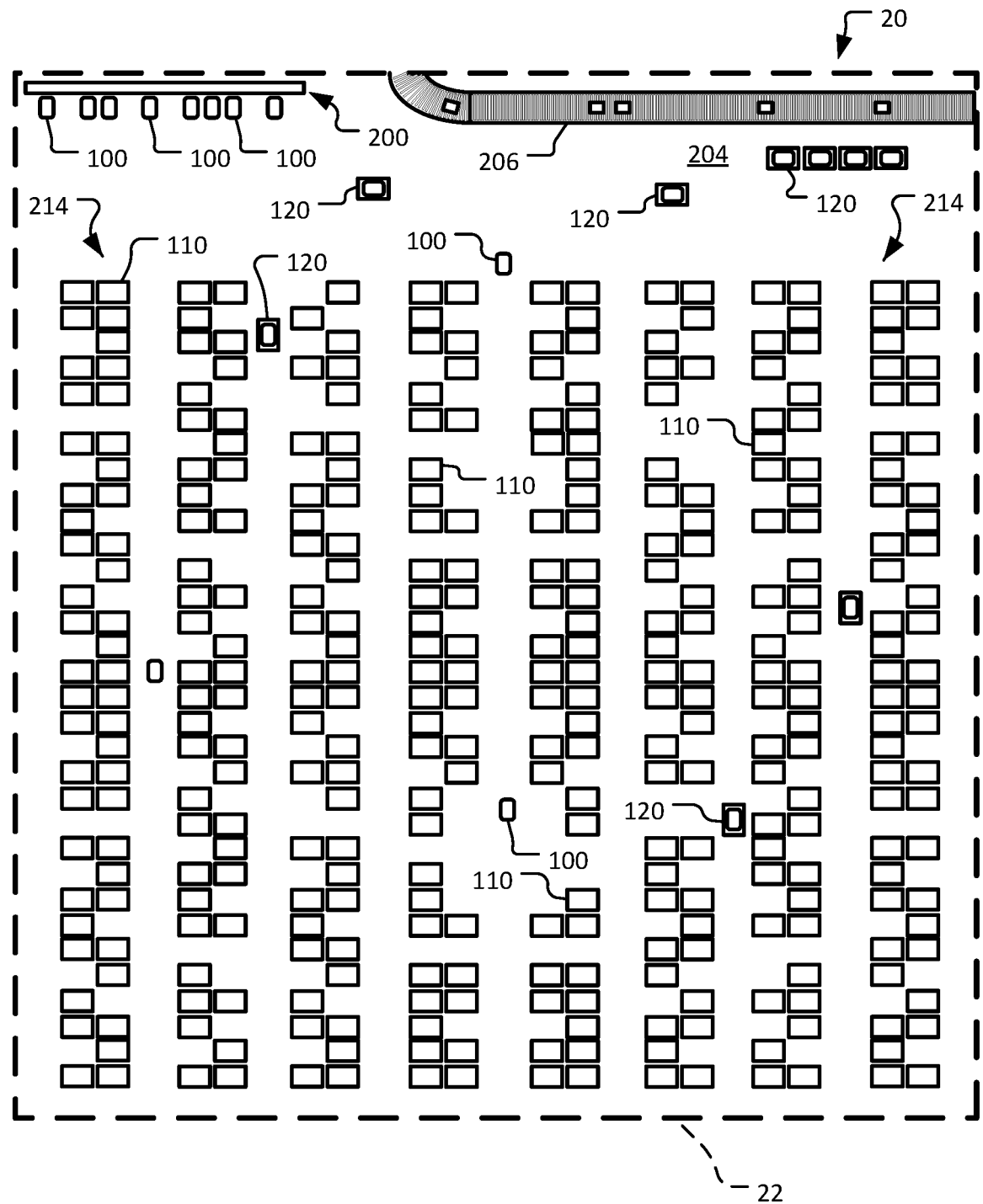
FIG. 2 illustrates a plan view of an example large mobile robot work field and a mobile robot charging station that is remotely located from the primary work field.

FIG. 2 provides a plan view (an overhead view) of another example warehouse operation 20 that uses the one or more mobile robots 100. The depicted warehouse operation 20 includes an example rack storage area 214 and an example processing area 204. A dashed-line periphery can define the work field 22 of the mobile robots 100. The work field 22 is the area in which the mobile robots 100 can travel. The primary work field of the mobile robots 100 includes the rack storage area 214, the processing area 204, and the areas there between.

The rack storage area 214 includes multiple racks 110 that are arranged in rows so as to define aisles along which the mobile robots 100 can travel. Individual mobile robots 100 can travel under a rack 110 and then raise the rack 110 off the floor to create a mobilized rack 120. At the processing area 204, a human worker or robot can transfer items stored on the racks 110 to a conveyor 206, or vice versa. The conveyor 206 can transfer the items to/from another area, such as to a shipping dock area, and the like.

The warehouse operation 20 also includes an example mobile robot charging station 200. When the onboard batteries of the mobile robots 100 become sufficiently depleted, the mobile robots 100 stop performing the work of transferring racks 110 and travel to the mobile robot charging station 200. At the mobile robot charging station 200, the mobile robots 100 connect to a supply of electrical energy to recharge the onboard batteries. This process can be performed autonomously. By monitoring its own battery status, a mobile robot 100 can detect when its energy level is low. In that case, the mobile robot 100 can travel to the charging station 200, electrically connect to the charging station 200, and receive recharging of its batteries. When a recharging mobile robot's 100 energy level is high enough, it disconnects from the charging station 200 and then travels back to the primary work area (e.g., the processing area 204 and the rack storage area 214) to resume working.

In the depicted example warehouse operation 20, the mobile robot charging station 200 is remotely located from the primary work field of the mobile robots 100. That is, the mobile robot charging station 200 is located away from the processing area 204 and the rack storage area 214. Accordingly, when the mobile robots 100 travel to the mobile robot charging station 200, the mobile robots 100 is not performing work and is traveling away from the primary work field of the mobile robots 100. The time that the mobile robots 100 spend traveling to and from the mobile robot charging station 200 can be considered unproductive time because the mobile robots 100 are not transferring any racks 110 during that travel time.

Figure 3:
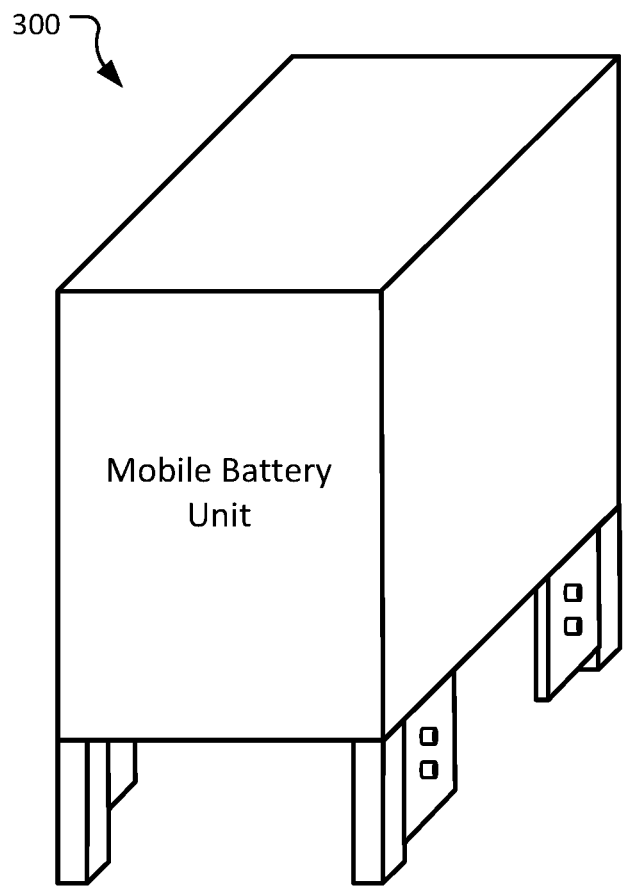
FIG. 3 illustrates an example mobile battery unit that can be transported by a mobile robot to a mobile robot work field so that the mobile battery unit can deliver electrical energy to recharge the batteries of mobile robots in their work field.

Also referring to FIG. 3, as an alternative to using the mobile robot charging station 200 to recharge the mobile robots 100, in some embodiments a mobile battery unit 300 can be used to recharge mobile robots 100. Unlike the mobile robot charging station 200, the mobile battery unit 300 is transportable such that it does not have to remain in a fixed location. That is, the mobile battery unit 300 can be transported to the primary work field of the mobile robots 100, and then one or more mobile robots 100 can be recharged by the mobile battery unit 300 right there in the primary work field of the mobile robots 100. Therefore, mobile robots 100 can be recharged without requiring the mobile robots 100 to travel to and from their primary work field. Accordingly, time spent traveling to and from the mobile robot charging station 200, as described in reference to FIG. 2, can be essentially eliminated.

In the depicted embodiment, the mobile battery unit 300 is configured to be transported by a mobile robot 100. That is, the same type of working mobile robot 100 that can be recharged by the mobile battery unit 300 can also be used to transport the mobile battery unit 300. To transport the mobile battery unit 300, in the depicted embodiment a mobile robot 100 can autonomously drive under the mobile battery unit 300 and then lift the mobile battery unit 300 to raise it off the floor. Then, with the mobile battery unit 300 raised from the floor, the mobile robot 100 can move to a desired location while transporting the mobile battery unit 300. In some embodiments, the mobile robot 100 can move the mobile battery unit 300 by pulling and/or pushing the mobile battery unit 300 (rather than by lifting the mobile battery unit 300).

The particular location(s) within the primary work field of the mobile robots 100 to which the mobile battery unit 300 will be positioned for recharging the mobile robots 100 can be determined by an external control system (e.g., a fleet management system, as described further below), and can be based on the charge status of the mobile robots 100 operating in the work field and other factors. An optimum location (e.g., a location at which the travel time of the mobile robots 100 needing recharging will be minimized) can be determined, and a mobile robot 100 can be controlled to autonomously transport the mobile battery unit 300 to that optimum location.

Figure 4:
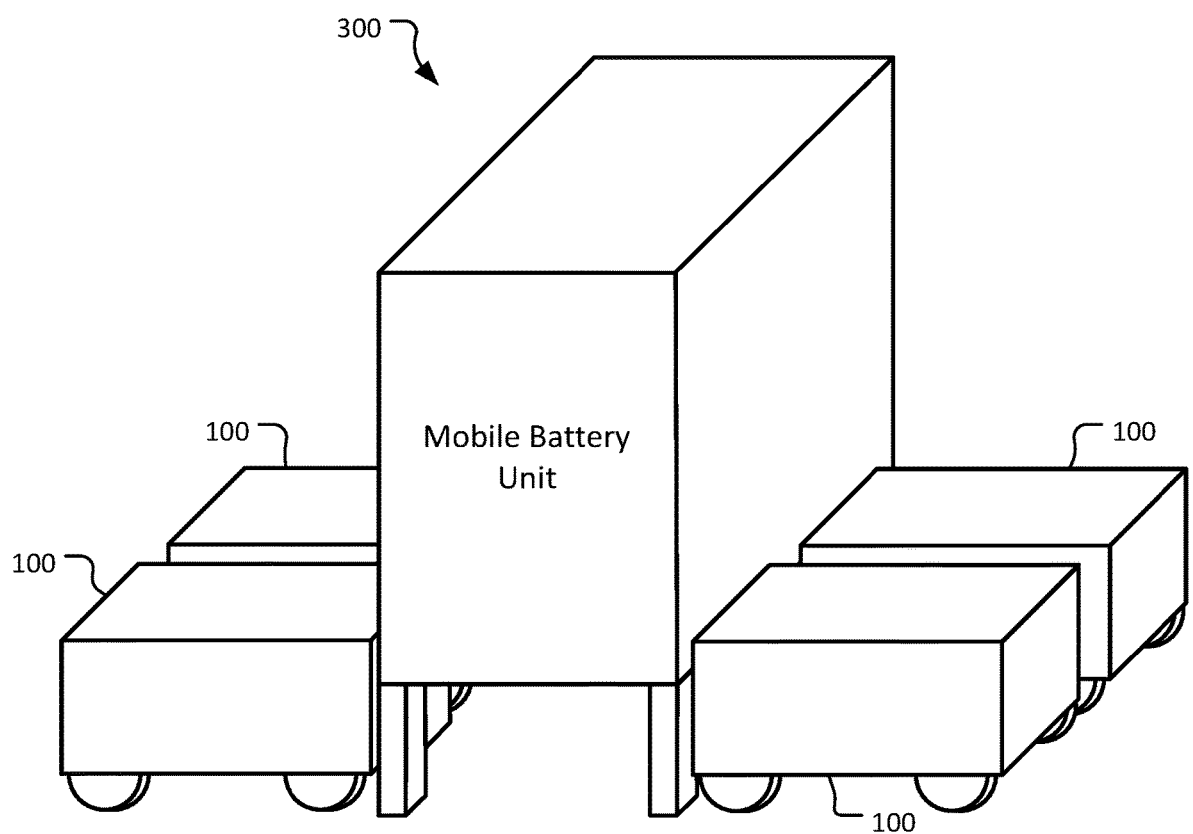
FIG. 4 illustrates the mobile battery unit of FIG. 3 while recharging four mobile robots.

Also referring to FIG. 4, the mobile robots 100 can be recharged by electrically connecting (e.g., docking) to the mobile battery unit 300. The energy capacity of the onboard batteries of the mobile battery units 300 is at least sufficiently large enough to recharge the onboard batteries of one or more of the mobile robots 100. In the depicted example, four mobile robots 100 are concurrently being recharged from a single mobile battery unit 300. In some embodiments, one, two, three, four, five, six, seven, eight, nine, ten, or more than ten mobile robots 100 can be concurrently recharged from a single mobile battery unit 300. In some embodiments, the mobile robots 100 can autonomously dock with the mobile battery unit 300 to receive recharging. After a mobile robot 100 has been sufficiently recharged, then the mobile robot 100 can autonomously separate from the mobile battery unit 300 and resume working.

Figure 5:
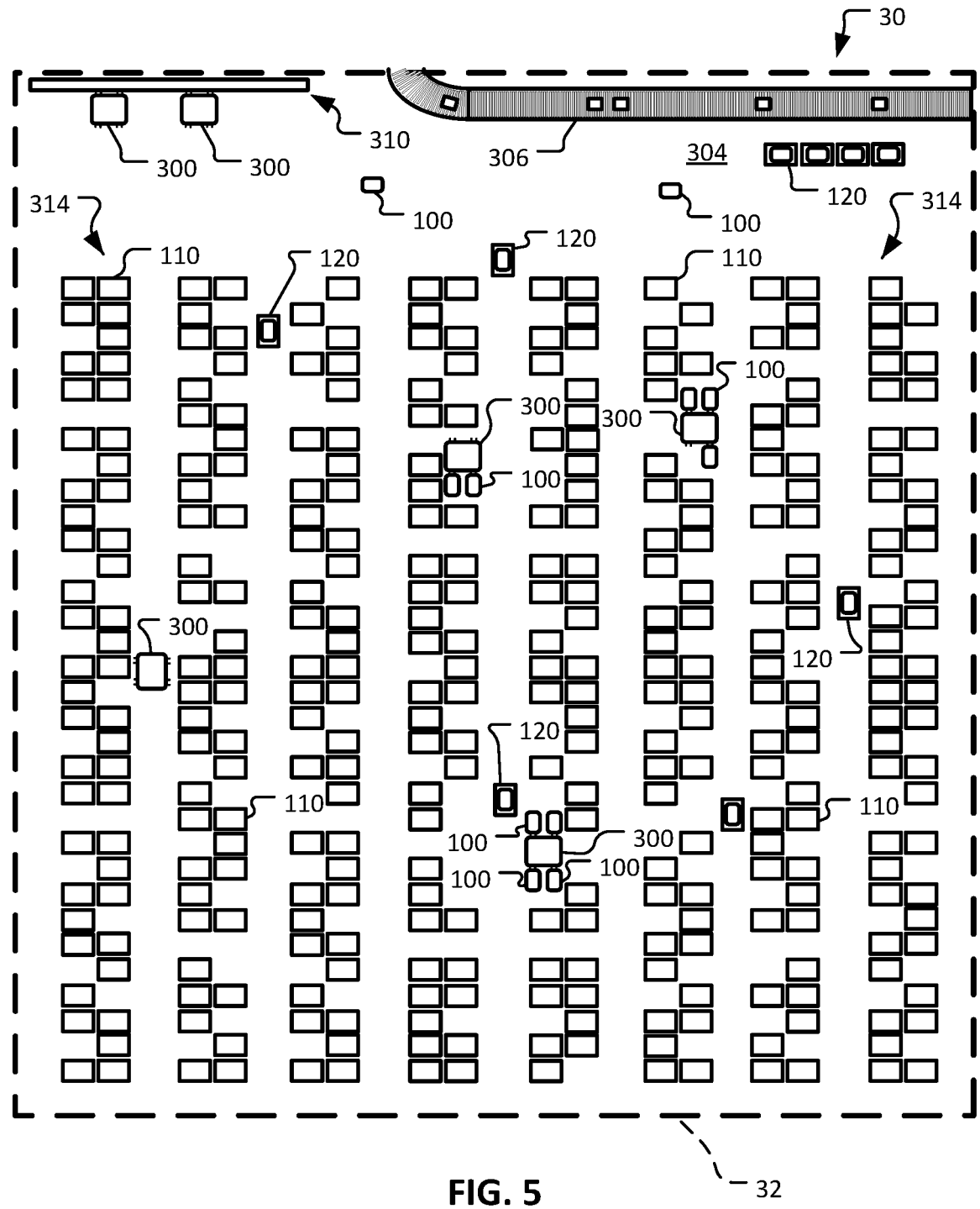
FIG. 5 illustrates a plan view of another example large mobile robot work field, and illustrates multiple autonomous mobile battery charging units being used to recharge mobile robots within the primary work field of the mobile robots.

FIG. 5 provides a plan view (an overhead view) of another example warehouse operation 30 that includes the one or more mobile robots 100 operating within an example work field 32. Analogously to the warehouse operation 20 described above (FIG. 2), the depicted warehouse operation 30 includes an example rack storage area 314 and an example processing area 304. Individual mobile robots 100 travel under a rack 110 and then raise the rack 110 off the floor to create a mobilized rack 120. The mobilized racks 120 travel between the rack storage area 314 and the processing area 304. In at least that manner, the mobile robots 100 are utilized to perform productive work (e.g., by transferring the racks 110).

The warehouse operation 30 also includes one or more mobile battery units 300. The mobile battery units 300 are transportable by the mobile robots 100 (as described above) and are thereby able to travel autonomously (e.g., within the work field 32). The energy capacity of the onboard batteries of the mobile battery units 300 is at least sufficiently large enough to recharge the onboard batteries of one or more of the mobile robots 100.

In operation, when the onboard batteries of the mobile robot(s) 100 become depleted, the mobile battery units 300 can be transported by a mobile robot 100 to the primary work area of the depleted mobile robot(s) 100. While in the primary work area of the mobile robot(s) 100, the mobile battery units 300 and the mobile robot(s) 100 can electrically connect to each other, and then electrical energy to recharge the onboard batteries of the mobile robot(s) 100 can be transferred from the mobile battery units 300 to the mobile robot(s) 100. For example, as depicted in FIG. 5, the mobile battery units 300 can enter into the rack storage area 314, and then electrically connect with one or more mobile robots 100 that have depleted onboard batteries to perform the recharging of the one or more depleted mobile robots 100.

When the one or more onboard batteries of the mobile battery units 300 themselves become depleted to the point that a recharging of the one or more onboard batteries of the mobile battery units 300 is needed, the mobile robots 100 can transport the depleted mobile battery units 300 to a recharging station 310. Still referring to FIG. 5, in some embodiments a recharging station 310 can be included in the work field 32, or adjacent thereto. The mobile battery units 300 can be transported to the recharging station 310 and electrically couple with the recharging station 310 to receive electrical energy to recharge its onboard batteries. Thereafter, the recharged mobile battery units 300 can resume being used for the process of recharging mobile robots 100 in response to control commands from an external control system.

The area(s) where the mobile battery units 300 are recharged are generally fixed, but they can be located in one or multiple locations anywhere in and/or around the mobile robot operating area. These locations may be serviced by high voltage electric power lines (e.g., 480V AC) converted to DC energy to recharge the batteries faster than running lower voltage power lines longer distances to multiple locations within the robot field to fixed battery charging units. These same locations serviced by high voltage AC power may be connected to one or more larger, high-capacity stationary storage battery units that the mobile battery units 300 directly connect to for recharging. In this case, the energy stored in the large, high-capacity stationary storage units will be already converted to DC power when the mobile battery units 300 connect to them resulting in even faster recharging rate of the mobile battery units. The fixed mobile battery recharging areas are located optimally where the total cost of setting up and maintaining the high-voltage wires to these locations, plus the ongoing cost of transporting the mobile battery units 300 to the same locations from the robot field by mobile robots, is minimized. Finally, if the high voltage energy lines that service the large, high-capacity stationary storage batteries are fed by a renewable energy source (e.g., solar panels, windmills, water flow, etc.) operated by the owner of the production facility or warehouse using the mobile robots, then any energy stored in the large, high-capacity stationary storage batteries in excess of demand of the battery recharging process may be used for other processes within the facility or even sold back to the primary power utility company for a potential profit.

Figure 6:
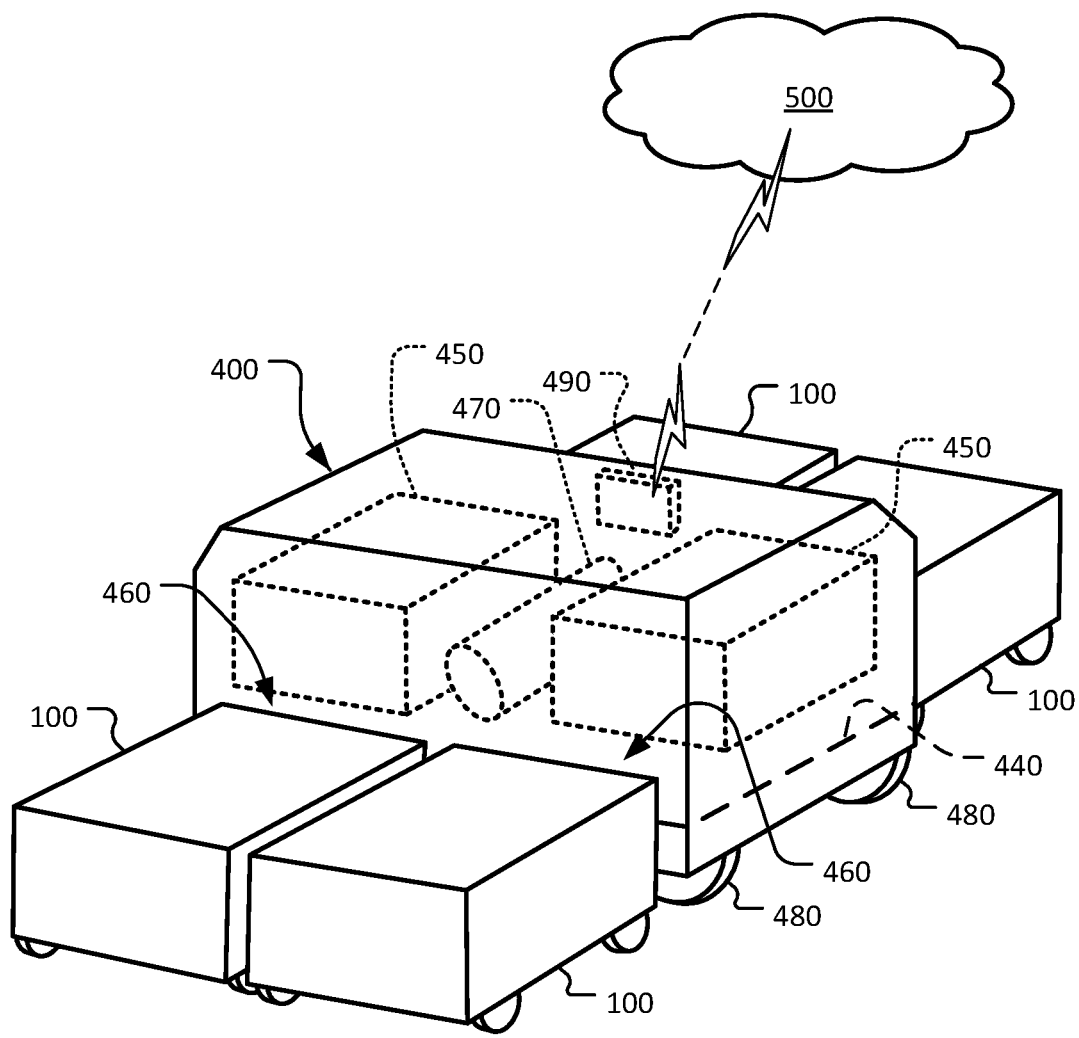
FIG. 6 illustrates an example autonomous mobile battery charging unit that is connected to multiple mobile robots to recharge the batteries of the mobile robots.

Referring also to FIG. 6, as an alternative to the mobile battery units 300 that are transportable by the mobile robots 100 as described above, in some embodiments autonomous mobile battery charging units 400 are self-mobile and are able to travel autonomously (e.g., within the work field 32). In that sense, the autonomous mobile battery charging units 400 are themselves mobile robots. However, the autonomous mobile battery charging units 400 are different than the mobile robots 100 at least in that the onboard batteries of the autonomous mobile battery charging units 400 have a larger energy capacity. In fact, the energy capacity of the onboard batteries of the autonomous mobile battery charging units 400 is at least sufficiently large enough to recharge the onboard batteries of one or more of the mobile robots 100.

In operation, when the onboard batteries of the mobile robot(s) 100 become depleted, the autonomous mobile battery charging units 400 can travel to the primary work area of the depleted mobile robot(s) 100. While in the primary work area of the mobile robot(s) 100, the autonomous mobile battery charging units 400 and the mobile robot(s) 100 can electrically connect to each other, and then electrical energy to recharge the onboard batteries of the mobile robot(s) 100 can be transferred from the autonomous mobile battery charging units 400 to the mobile robot(s) 100. For example, as depicted in FIG. 6, the autonomous mobile battery charging units 400 can enter into the rack storage area 314, and then electrically connect with one or more mobile robots 100 that have depleted onboard batteries to perform the recharging of the one or more depleted mobile robots 100.

While the depicted example shows four mobile robots 100 simultaneously receiving electrical energy from the autonomous mobile battery charging unit 400, it should be understood that in some embodiments one, two, three, four, five, six, seven, eight, nine, ten, eleven, twelve, or more than twelve mobile robots 100 can be recharged simultaneously from a single mobile battery charging unit 400.

In some embodiments, the mobile battery charging unit 400 is structured to include: (i) a chassis 440, (ii) one or more onboard batteries 450 coupled to the chassis 440, (iii) a plurality of electrical connections 460 in electrical communication with the one or more onboard batteries 450, (iv) one or more motors 470 coupled to the chassis, (v) one or more wheels 480 movably coupled to the chassis 440 and operatively coupled to the one or more motors 470 (such that activating the one or more motors 470 drives the one or more wheels 480 and thereby causes the autonomous mobile battery charger system 400 to move along a floor surface that the one or more wheels 480 contact), and (vi) an onboard controller 490 configured to wirelessly communicate with an external control system 500, and to actuate the one or more motors 470 in response to control commands wirelessly received from the external control system 500. In some embodiments, the mobile battery charging unit 400 can include one or more ground straps to facilitate electrical grounding of the structure of the mobile battery charging unit 400. The one or more mobile robots 100 also wirelessly communicate with the external control system 500 and execute control commands received from the external control system 500 (e.g., to move particular racks 110 around within the work field 32, to electrically couple with a mobile battery charging unit 400, and so on).

In some embodiments, the external control system 500 can comprise a warehouse fleet manager system. The external control system 500 (e.g., warehouse fleet manager system) can automatically control the movements and actions of the mobile robots 100 and of the autonomous mobile battery charging units 400 as described above. For example, the mobile robots 100 and/or autonomous mobile battery charging units 400 can be in wireless communication with the fleet manager system such that the fleet manager system can detect the locations of the mobile robots 100 and autonomous mobile battery charging units 400, and send control commands to the mobile robots 100 and autonomous mobile battery charging units 400 (or to a mobile battery unit 300 being transported by a mobile robot 100) to cause them move when and where as necessary to execute the recharging processes described herein. In some embodiments, the mobile robots 100 and/or autonomous mobile battery charging units 400 can include vision systems, RF systems, ultrasonic systems, optical systems, and/or other types of sensors and systems to facilitate the execution of the processes described herein.

As described above, the use of the autonomous mobile battery charging units 400 (or mobile battery units 300) can serve to reduce the amount of time that the mobile robots 100 spend traveling to obtain a battery recharge. Said another way, using the autonomous mobile battery charging units 400 (or mobile battery units 300), the efficiency and utilization of the mobile robots 100 can be enhanced by eliminating non-value-added travel time related to battery recharging. Moreover, less overall energy is expended and mobile robot operations can be more flexible, scalable, and economical using the autonomous mobile battery charging units 400 (or mobile battery units 300).

When the one or more onboard batteries of the autonomous mobile battery charging units 400 are depleted to the point that recharging is needed, the autonomous mobile battery charging units 400 can travel to a recharging station (such as the recharging station 310 of FIG. 5). As an alternative to recharging the onboard batteries of the autonomous mobile battery charging units 400 at the recharging station 310, in some embodiments depleted onboard batteries of the autonomous mobile battery charging units 400 can be interchanged with fully charged batteries. In other words, the one or more onboard batteries of the autonomous mobile battery charging units 400 can be swapped out when the one or more onboard batteries become depleted. The battery swap out process can take place at a battery interchange station (e.g., at a station similar to the station 310 described above but with battery interchange capabilities), either manually, automatically, or semi-automatically. In some cases, runtime and utilization efficiencies of the autonomous mobile battery charging units 400 can be enhanced by swapping out depleted batteries with more fully charged batteries (in comparison to causing the autonomous mobile battery charging units 400 to idly wait for recharging of its one or more onboard batteries).

Additional Optional Features and Embodiments

While the systems and methods described above include the process of transferring energy to recharge depleted onboard batteries of mobile robots 100 (while the mobile robots 100 remain idle, waiting for the recharging to be completed), in some embodiments depleted onboard batteries of the mobile robots 100 can be interchanged with more fully-charged batteries. Such a battery interchange technique can serve to enhance runtime and utilization efficiencies of the mobile robots 100 in some cases, because there is less downtime incurred in comparison to recharging the onboard batteries of the mobile robots 100. This battery interchange technique can be implemented in multiple ways. In one example implementation, the mobile robots 100 can travel to a station at which the battery interchange can take place. In another example implementation, a dedicated mobile robot that is designed to facilitate the battery interchange process can travel into the mobile robot work field (in the manner of the autonomous mobile battery charging units 400 as described above) and the battery interchange technique can take place. In other words, a working mobile robot 100 can stop working when its battery becomes depleted and then a battery interchange mobile robot can travel to the location of the awaiting depleted mobile robot 100. Then, the battery interchange mobile robot in conjunction with the depleted mobile robot 100 can execute the process of swapping out the depleted battery of the mobile robot 100 with a more fully-charged battery. Then, the mobile robot 100 can resume its work. Minimal downtime by the mobile robot 100 is incurred as a result of the battery interchange.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, a trackball, or a touchscreen, etc.) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, tactile input, eye movement tracking input, a brain-computer interface, gesture input, and the like, and combinations thereof).

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

What is claimed is:

1. A mobile robot system, comprising:
    a control system;
    one or more mobile robots in communication with the control system such that the one or more mobile robots individually move along a floor surface in accordance with mobile robot control commands that are received from the control system; and
    a mobile battery unit configured to be transported along the floor surface by an individual mobile robot in response to control commands that are received by the individual mobile robot from the control system, the mobile battery unit comprising:
        one or more onboard batteries; and
        a plurality of electrical connections in electrical communication with the one or more onboard batteries and configured to releasably couple with corresponding electrical connections of the one or more mobile robots such that energy from the one or more onboard batteries is transferred to the one or more mobile robots,
        wherein the plurality of electrical connections configures the mobile battery unit to releasably couple with and transfer the energy from the one or more onboard batteries to two or more of the mobile robots simultaneously.

2. The mobile robot system of claim 1, wherein the energy from the one or more onboard batteries is transferred to respective onboard batteries of the one or more mobile robots when the plurality of electrical connections are coupled with the corresponding electrical connections of the one or more mobile robots.

3. The mobile robot system of claim 1, wherein the plurality of electrical connections configures the mobile battery unit to releasably couple with and transfer the energy from the one or more onboard batteries to four or more of the mobile robots simultaneously.

4. The mobile robot system of claim 1, wherein the mobile battery unit is a first mobile battery unit and wherein the system further comprises a second mobile battery unit.

5. The mobile robot system of claim 4, further comprising a docking station configured to electrically releasably couple with the first and second mobile battery units, individually, and to charge the respective one or more onboard batteries of the first and second mobile battery units.

6. The mobile robot system of claim 5, wherein the docking station comprises one or more high-capacity stationary storage battery units that are charged by high voltage AC power.

7. A method for recharging one or more mobile robots, the method comprising:
controlling, by a control system, a first mobile robot to autonomously move across a floor surface to a first location of a first mobile battery unit, wherein the first mobile battery unit comprises one or more onboard batteries;
controlling, by the control system, the first mobile robot to autonomously engage with the first mobile battery unit and to transport the first mobile battery unit to a second location determined by the control system;
controlling, by the control system, a second mobile robot and a third mobile robot to autonomously move across the floor surface toward the first mobile battery unit while the first mobile battery unit is at the second location and to electrically couple with the first mobile battery unit such that energy from the one or more onboard batteries of the first mobile battery unit is simultaneously transferred to the second and third mobile robots.

8. The method of claim 7, further comprising determining, by the control system, the second location based on respective locations of the second and third mobile robots prior to the electrical coupling of the second and third mobile robots with the first mobile battery unit.

9. A mobile robot system, comprising:
an external control system;
two or more mobile robots in wireless communication with the external control system such that the two or more mobile robots individually move along a floor surface in accordance with mobile robot control commands that are wirelessly received from the control system; and
an autonomous mobile battery charger in wireless communication with the external control system such that the autonomous mobile battery charger moves along the floor surface in accordance with mobile battery charger control commands that are wirelessly received from the external control system, the autonomous mobile battery charger comprising:
one or more onboard batteries; and
a plurality of electrical connections in electrical communication with the one or more onboard batteries and configured to releasably couple with corresponding electrical connections of the two or more mobile robots such that energy from the one or more onboard batteries is simultaneously transferred to at least two of the two or more mobile robots.

10. The mobile robot system of claim 9, wherein the plurality of electrical connections configures the autonomous mobile battery charger to releasably couple with and transfer the energy from the one or more onboard batteries to four or more of the mobile robots simultaneously.

11. The mobile robot system of claim 9, wherein the autonomous mobile battery charger is a first autonomous mobile battery charger and further comprising a second autonomous mobile battery charger.

12. The mobile robot system of claim 11, further comprising a docking station configured to electrically releasably couple with the first and second autonomous mobile battery chargers, individually, and to charge the respective one or more onboard batteries of the first and second autonomous mobile battery chargers.

13. The mobile robot system of claim 9, wherein the autonomous mobile battery charger unit further comprises:
a chassis to which the one or more onboard batteries are coupled;
one or more motors coupled to the chassis;
one or more wheels movably coupled to the chassis and operatively coupled to the one or more motors such that activating the one or more motors drives the one or more wheels and thereby causes the autonomous mobile battery charger unit to move along a floor surface that the one or more wheels contact; and
an onboard controller configured to wirelessly communicate with the external control system and to actuate the one or more motors in response to control commands wirelessly received from the external control system.

14. The mobile robot system of claim 13, wherein the plurality of electrical connections configures the autonomous mobile battery charger unit to releasably couple with and to transfer the energy from the one or more onboard batteries to four or more mobile robots simultaneously.

* * * * *